(12) United States Patent
Leusner et al.

(10) Patent No.: US 10,962,156 B2
(45) Date of Patent: Mar. 30, 2021

(54) HOSE CLAMP

(71) Applicant: NORMA Germany GmbH, Maintal (DE)

(72) Inventors: Oliver Leusner, Taunusstein (DE); Yassine Bennai, Vigneux sur Seine (FR); Detlef Henrich, Limeshain (DE); Frank Lange, Büdingen (DE); Mathias Krauß, Nidderau (DE); Björn Möller, Nidderau (DE)

(73) Assignee: Norma Germany GmbH, Maintal (DE)

( * ) Notice: Subject to any disclaimer, the term of this patent is extended or adjusted under 35 U.S.C. 154(b) by 193 days.

(21) Appl. No.: 16/304,373

(22) PCT Filed: May 10, 2017

(86) PCT No.: PCT/EP2017/061144
§ 371 (c)(1),
(2) Date: Nov. 26, 2018

(87) PCT Pub. No.: WO2017/202609
PCT Pub. Date: Nov. 30, 2017

(65) Prior Publication Data
US 2019/0293216 A1 Sep. 26, 2019

(30) Foreign Application Priority Data
May 24, 2016 (DE) .......................... 102016109548.6

(51) Int. Cl.
*F16L 33/08* (2006.01)

(52) U.S. Cl.
CPC ................................... *F16L 33/08* (2013.01)

(58) Field of Classification Search
CPC ............ F16L 33/085; F16L 33/08; F16B 2/08
See application file for complete search history.

(56) References Cited

U.S. PATENT DOCUMENTS

| 3,365,128 A | 1/1968 | Townsend, Jr. |
| 3,477,406 A | 11/1969 | Fujinaga |
| 7,896,400 B2 | 3/2011 | Brill et al. |
| 8,607,420 B2 | 12/2013 | De Campos et al. |

(Continued)

FOREIGN PATENT DOCUMENTS

| CN | 101542179 A | 9/2009 |
| CN | 101855487 A | 10/2010 |

(Continued)

OTHER PUBLICATIONS

First Japanese Office Action for Japanese Patent Application No. 2018-562038 dated Jan. 14, 2020 (6 pages).

(Continued)

*Primary Examiner* — David Bochna
*Assistant Examiner* — James A Linford
(74) *Attorney, Agent, or Firm* — Reising Ethington, P.C.

(57) ABSTRACT

A hose clamp includes a clamping strip and a tightening device for tightening the clamping strip. A first clip element that is arranged on the clamping strip allows the hose clamp to be secured to a hose at an axially defined distance from a hose end. A second clip element that is arranged on the clamping strip places the clamping strip at a distance (A) from the outer surface of the hose.

8 Claims, 2 Drawing Sheets

(56) References Cited

U.S. PATENT DOCUMENTS

| | | | | |
|---|---|---|---|---|
| 2002/0060453 A1* | 5/2002 | Spurgat | ................... | F16L 33/08 285/23 |
| 2004/0207195 A1 | 10/2004 | Bowater | | |
| 2010/0058563 A1* | 3/2010 | Col | ......................... | F16L 33/08 24/279 |
| 2012/0124784 A1 | 5/2012 | Chung et al. | | |
| 2020/0173587 A1* | 6/2020 | Breideband | ............. | F16L 33/08 |

FOREIGN PATENT DOCUMENTS

| | | |
|---|---|---|
| CN | 102478137 A | 5/2012 |
| CN | 102494212 A | 6/2012 |
| DE | 19533553 C2 | 1/1998 |
| DE | 102006057497 A1 | 3/2008 |
| DE | 202011005396 U1 | 8/2011 |
| DE | 102006048336 B4 | 7/2013 |
| EP | 1939513 A2 | 7/2008 |
| FR | 2887321 A1 | 12/2006 |
| JP | 2010501797 A | 1/2010 |
| KR | 970043572 U | 7/1997 |

OTHER PUBLICATIONS

English Translation of First Japanese Office Action for Japanese Patent Application No. 2018-562038 dated Jan. 14, 2020 (11 pages).

Korean Office Action for Korean Application No. 102018037366 dated Mar. 17, 2020 (5 pages).

English Translation of Korean Office Action for Korean Application No. 102018037366 dated Mar. 17, 2020 (5 pages).

International Search Report for PCT/EP2017/061144, dated Aug. 3, 2017, 4 pages.

English Translation of International Search Report for PCT/EP2017/061144, dated Aug. 3, 2017, 3 pages.

* cited by examiner

HOSE CLAMP

INTRODUCTION

The present disclosure relates to a hose clamp having a clamping band and having a tightening device for tightening the clamping band, wherein a first clip element is arranged on the clamping band by way of which the hose clip is fixable to a hose at an axially determined distance from a hose end.

DE 10 2006 057 497 A1 discloses a hose clamp having a clamping band and having a tightening device for tightening the clamping band, three clip elements being arranged uniformly distributed over the circumference of the clamping band. By way of the clip elements, the hose clamp is fixable to a hose end concentrically to the hose at an axially defined distance from a hose end. If the hose clamp is situated on the hose, a constant distance is set between the outside surface of the hose and the clamping band over the entire surface. If the tightening device is actuated and consequently the clamping band is tightened, the clamping band can be released from the clip elements one after another. As a result, the clamping band is then no longer situated in a holding connection with the clip elements. The clip elements, however, can remain on the hose end in a functionless manner, for example as a result of crimping said hose end.

When removing the clamping band from the three clip elements, the order in which the clamping band can be released from the clip elements is left to chance. The tightening device can thus migrate in the circumferential direction as a result, in particular when the end of the clamping band is pulled into the tightening device. A further disadvantage occurs as a result of the preset diameter of the hose clamp having to correspond with the diameter of the hose on account of the defined geometry of the clip elements. There is only limited compensation possibility, for example by means of a one-sided bulge of the clamping band. A further disadvantage occurs in the case of a tightened hose clamp as a result of the clip elements no longer being in contact with the clamping band and the clip elements being able to come loose over a longer service life as a result of the rather weakly holding crimping connection to the hose end.

SUMMARY

An object of the disclosure, in an embodiment, is the provision of a hose clamp with improved positioning on a hose. In particular, the object consists in, with as little expenditure as possible, enabling variable pre-positioning of the hose clamp on the hose and creating compensation of diameters. In this case, the clip element, in particular, is to be able to be held securely on the hose once the clamping band has been released.

The disclosure, in an embodiment, includes the technical teaching that in addition to the first clip element at least one second clip element is arranged on the clamping band which positions the clamping band at a radial distance from the outside surface of the hose.

The disclosure, in this case, makes use of the possibility of using at least two clip elements for prefixing the clamping band on the hose, a first clip element moving the clamping band in particular directly into contact with the hose surface of the hose, whilst the second clip element is realized at a radial distance such that the clamping band forms a type of bulge over the outside surface of the hose in the region of the second clip element. The achievement here is that different preset diameters of hose clip can be compensated for by the second clip element. A third clip element is not necessary in every case but can be provided as an option. The first clip element, in this case, serves in particular for fixing the axial distance between the clamping band and the hose end and the second clip element also serves for the axial fixing but also for determining a radial distance between the clamping band and the outside surface of the hose. Consequently, the hose clamp is prepositioned in a defined manner on the hose end in the circumferential direction and in the axial direction. In this case, the hose clamp is effectively prevented from tilting.

An advantageous arrangement, in an embodiment, when using precisely two clip elements provides that the second clip element is arranged on the clamping band approximately diametrically opposite the first clamping band. A diametrically opposite arrangement of the two clip elements means that the hose clamp is prefixed on the hose in a tipsafe manner. With three clip elements, uniform distribution over the circumference of the hose clamp is often advantageous.

The first clip element, in this case, is realized, in particular, such that the clamping band extends tightly bordering on or abutting against the outside surface of the hose in the region of the first clip element. The second clip element being arranged opposite the first clip element produces a distance between the clamping band and the outside surface of the hose prior to the tightening of the clamping band. Consequently, a crescent-shaped opening, which comprises a maximum opening width in the region of the second clip element, is created between the clamping band and the hose cross section.

Further advantageously, in an embodiment, the second clip element comprises a latching portion into which the clamping band is latched prior to the tightening of the tightening device and from which the clamping band is automatically releasable when the tightening band is tightened. The advantage of the clip element not having to deform plastically is achieved as a result. In addition, the clamping band can bridge the distance between the clamping band and the outside surface of the hose during the tightening of the tightening device. For this purpose, the connection between the clamping band and the clip element provides that when a certain tightening force is achieved, the clamping band is released from the latching portion such that the clamping band is able to abut against the outside surface over the entire surface without causing the clip element to deform plastically.

According to a further development of the hose clamp, in an embodiment, the second clip element is formed from a one-part and multiply-curved sheet metal element, wherein the sheet metal element comprises an end portion which is realized such that, once the tightening device has been tightened, it is held between clamping band and hose. The end portion extends, in this case, in such a manner to the latching portion that the clamping band is released from the latching portion when the clamping device is tightened, the clamping band moving into abutment against the end portion and when the tightening device is definitively tightened, jamming the end portion between the clamping band and the outside surface of the hose. As a result thereof, the clip element is fixed to the hose end of the clamping band in addition to the crimping such that the clip element is held non-functionally but captively on the hose end. In particular, said advantage is achieved by the end portion overlapping with the latching portion.

According to a further advantageous design of the second clip element, in an embodiment, a spacer portion is realized between the latching portion and the end portion. The end portion, in this case, already abuts against the outside surface of the hose in the prefixed state of the hose clamp. The spacer portion then ensures that the latching portion assumes the desired distance from the outside surface of the hose. Once the clamping band is situated latched in the latching portion, the clamping band finally obtains the desired distance from the outside surface in the region of the second clip element.

The clip element is realized, in particular in an embodiment, such that the latching portion, the end portion and the spacer portion form a U-shaped part of the sheet metal element, wherein the latching portion and the end portion form legs of the U-shape and extend approximately parallel to one another, wherein the spacer portion forms a base portion of the U-shape and extends perpendicularly to the latching portion and to the end portion.

In a design according to an embodiment, the latching portion is defined in particular by two indentations, wherein edges of the clamping band are receivable in a latching manner between the indentations and a base of the latching portion. The clamping band, in this case, prior to the tightening of the hose clamp, can be held under light pretension between the base and the indentations of the latching portion and can, in particular, abut against the base. As a result, the clip element is fixed in a non-positive locking manner on the clamping band also in the circumferential direction.

The indentations, in this case, can extend over the entire width of the clip element. In a design in an embodiment, which is advantageous, in particular, for smaller clamp diameters, the indentations extend only over part of the width of the clip element and are arranged, in this case, in particular centrally.

In a manner, in this case, an embossing, which protrudes in the direction of the end portion, is realized in the base of the latching portion. Said embossing, with the clip element mounted, then presses onto the outside of the clamping band. Higher forces are thus transmissible in the circumferential direction between clip element and clamping band.

Beginning from the latching portion, a fastening portion with a clamp part can be realized in the sheet metal element, by way of which fastening portion the second clip element is fastenable to the hose end. The fastening portion with the clamp part, in this case, forms a first end of the sheet metal element, the end portion forming a second end of the sheet metal element for the holding arrangement of the clip element between the clamping band and the outside surface of the hose. The sheet metal element is realized continuously in particular with a constant width between said two ends. In this embodiment, further advantageously, a reinforcement bead can be inserted into the sheet metal element at the transition between the latching portion and the fastening portion. Unwanted plastic deformation of the clip element is largely prevented by way of the reinforcement bead.

BRIEF DESCRIPTION OF THE FIGURES

Further measures improving the disclosure together with the description of a preferred exemplary embodiment of the disclosure are shown in more detail below by way of the figures, in which.

DETAILED DESCRIPTION

Figure 1:
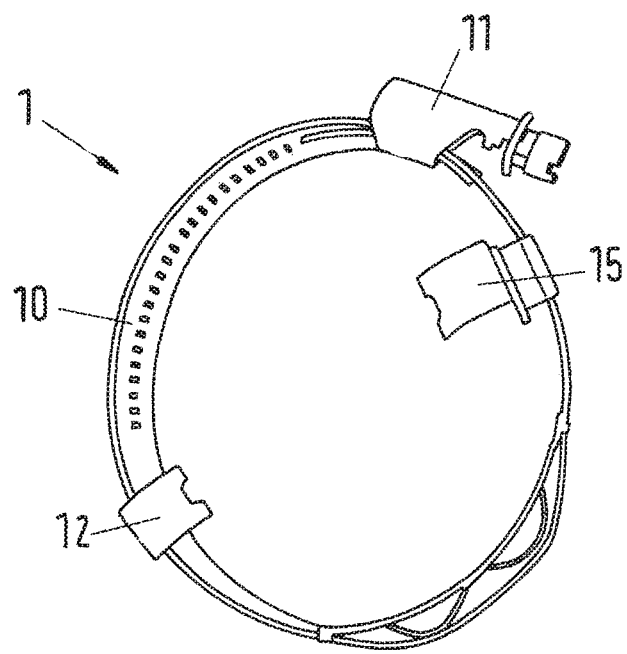
FIG. 1 shows a view of a hose clamp having a first clip element and having a second clip element located opposite thereto.

FIG. 1 shows an embodiment of a hose clamp 1 having a clamping band 10 and a tightening device 11 for tightening the clamping band 10. As a result of activating the tightening device 11, a free end of the clamping band 10 is pulled into the tightening device 11 such that the diameter of the hose clamp 1 is correspondingly reduced. A first clip element 12 is shown in an arrangement on the clamping band 10. In an approximately diametrically opposite position, the hose clamp 1 comprises a second clip element 15 which is also arranged on the clamping band 10. At least the second clip element 15, in this case, is not received in a non-releasable manner on the clamping band 10 but is held on the second clip element 10 in a purely latching manner. The first clip element 12 can be fixedly connected to the clamping band 10, it also being possible for it to be releasably connected to the clamping band 10 as an alternative. In particular, it is possible for all the clip elements to be designed in an identical manner.

Figure 2:
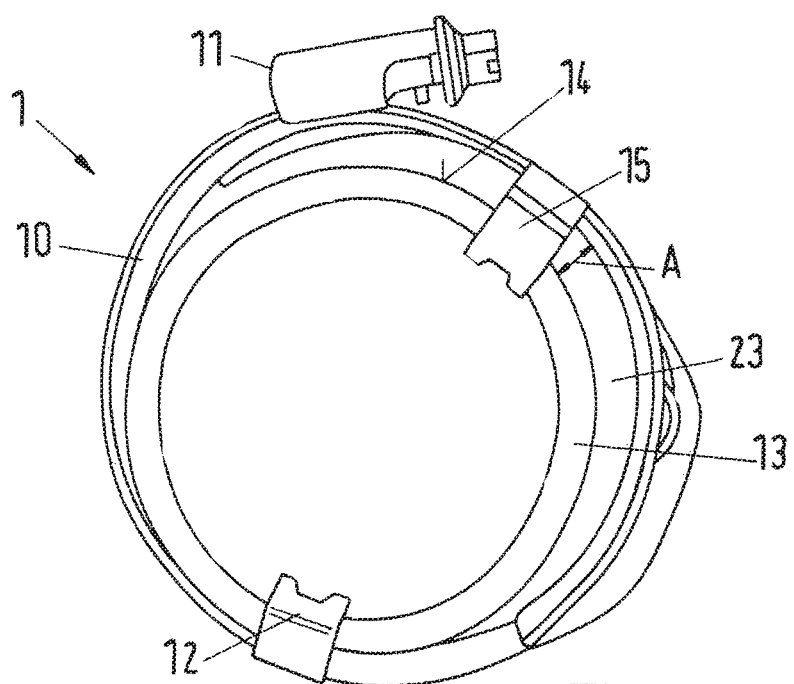
FIG. 2 shows the hose clamp according to FIG. 1 in an arrangement on a hose and FIG. 3 shows a view of a detail of the second clip element.

FIG. 2 shows the hose clamp 1 in an arrangement on a hose 13. The first clip element 12 and the second clip element 15 rest on a hose end 14 and are crimped to said hose end. The first clip element 12, in this case, is realized such that the clamping band 10 extends tightly bordering on or abutting against the outside surface of the hose 13 in the region of the first clip element 12. The second clip element 15 is realized such that the clamping band 10 extends at a radial distance from the outside surface of the hose 13. As a result of said arrangement, tilt-safe fixing of the hose clamp 1 on the hose 13 is achieved. If the tightening device 11 is actuated, the clamping band 10 is released from the second clip element 15 and the distance A is overcome such that a crescent-shaped opening 23 is closed. In this case, the clamping band 10 abuts against the outside surface of the hose 13 over its entire surface and is thus able to introduce a radially inwardly directed holding force.

Figure 3:
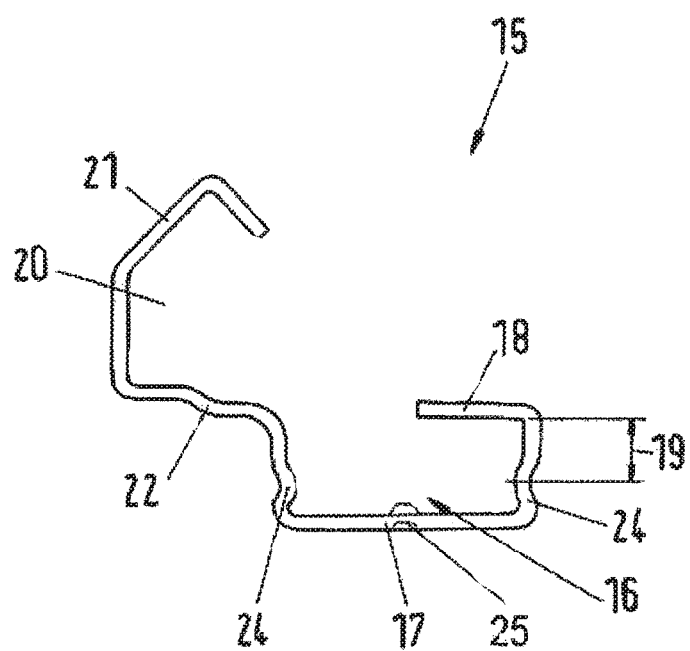

FIG. 3 shows a profile view of the second clip element 15 which is formed from a continuous, strip-shaped sheet metal element 17. The clip element 15, in this case, is shown from the side. In order to crimp the second clip element 15 on the hose end 14, the clip element 15 is provided with a clamp part 21 in a fastening portion 20. Using a corresponding crimping device, the sheet metal element 17 can be plastically deformed in the region of the clamp part 21 in such a manner that the fastening portion 20 locks right around an open hose end 14 of the hose 13.

In the transition from the fastening portion 20 to a latching portion 16, the sheet metal element 17 comprises a reinforcement bead 22, the achievement of said reinforcement bead being that the plastic deformation of the fastening portion 20 does not continue into the latching portion 16. The latching portion 16 serves for the purpose of holding the clamping band 10 at a releasable force, for which purpose the end regions of the latching portions 16 comprise indentations 24.

A spacer portion 19 connects to the indentation 24, which is realized on the right-hand side in the image plane, on the latching portion 16. The end portion 18 then connects to the spacer portion 19. The latching portion 16, the end portion 18 and the spacer portion 19, in this case, form a U-shape, the spacer portion 19 extending between two legs of the U-shape which extend perpendicularly to the spacer portion 19 and are formed by the latching portion 16 and the end portion 18. Consequently, the end portion 18 extends along behind the latching portion 16 by way of an overlap.

The latching portion 16, in this case, is defined by two indentations 24. Said indentations 24, in this case, do not extend in particular over the entire width of the clip element but only over part, being realized in particular in a central manner. The indentations consequently lead, on the one hand, to a reinforcement of the clip element, on the other hand a secure hold can be achieved even in the case of smaller clamp diameters.

With the clip element mounted, edges of the clamping band reach under the indentations 24, such that the clamping band is held between the indentations and a base of the latching portion 16, in particular under pretension. When the hose clamp is tightened, the edges of the clamping band slide past the indentations 24 and the clamping band moves out of latching engagement with the latching portion 16.

In order to obtain greater friction between the clamping band and the clip element 15, an embossing 25 can be realized in the base of the latching portion. Said embossing, with the clip mounted, presses onto an outside of the clamping band. The clip element is thus fixed securely on the clamping band also in the circumferential direction.

If the clamping band 10 moves out of latching engagement with the latching portion 16, the clamping band 10 thus abuts against the outside surface of the hose 13. In this case, it jams the end portion 18 between the clamping band 10 and the hose 13. As a result, the second clip element 15, with hose clamp 1 tightened, is fixed between the clamping band 10 and the hose 13, said fixing being generated at the hose end 14 in addition to the crimping of the fastening portion 20.

The invention is not limited in its realization to the preferred exemplary embodiment specified above. A number of variants, which make use of the solution shown even in the case of basically different realizations, are in fact conceivable. All features and/or advantages, including structural details or spatial arrangements, derived from the claims, the description or the drawings can be essential to the invention both on their own and in the most varied combinations.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCES

1 Hose clamp
10 Clamping band
11 Tensioning device
12 First clip element
13 Hose
14 Hose end
15 Second clip element
16 Latching portion
17 Sheet metal element
18 End portion
19 Spacer portion
20 Fastening portion
21 Clamp part
22 Reinforcement bead
23 Crescent-shaped opening
24 Indentation
25 Embossing
A Distance

The invention claimed is:

1. A hose clamp comprising a clamping band and a tightening device for tightening the clamping band, wherein a first clip element is arranged on the clamping band which is configured to fix the hose clamp to a hose at an axially determined distance from a hose end,
wherein a second clip element is arranged on the clamping band which positions the clamping band at a radial distance from an outside surface of the hose, wherein the second clip element comprises a latching portion in which the clamping band is latched prior to the tightening of the tightening device and from which the clamping band is releasable when the tightening device is tightened, wherein the second clip element is formed from a one-part and multiply-curved sheet metal element, wherein the sheet metal element comprises an end portion which is configured to be held between clamping band and the hose once the tightening device has been tightened, wherein an embossing which protrudes in the direction of the end portion is arranged in a base of the latching portion, the embossing being configured to press onto an outside of the clamping band when the clamping band is latched.

2. The hose clamp as claimed in claim 1, wherein the second clip element is arranged on the clamping band generally diametrically opposite the first clip element.

3. The hose clamp as claimed in claim 1, wherein the first clip element is configured to tightly border or abut the clamping band on or against the outside surface of the hose in the region of the first clip element.

4. The hose clamp as claimed in claim 1, wherein a spacer portion is arranged between the latching portion and the end portion.

5. The hose clamp as claimed in claim 4, wherein the latching portion, the end portion and the spacer portion form an U-shaped part of the sheet metal element, wherein the latching portion and the end portion form legs of the U-shaped part of the sheet metal element and extend approximately parallel to one another, wherein the spacer portion forms a base portion of the U-shaped part of the sheet metal element and extends perpendicularly to the latching portion and to the end portion.

6. The hose clamp as claimed in claim 5, wherein the latching portion comprises two indentations, wherein edges of the clamping band are configured to be received in a latching manner between the indentations and the base of the latching portion.

7. The hose clamp as claimed claim 1, wherein, beginning from the latching portion, a fastening portion is continued with a clamp part which is configured to fasten the second clip element to the hose end.

8. The hose clamp as claimed in claim 7, wherein a reinforcement bead resides in the sheet metal element at the transition between the latching portion and the fastening portion.

* * * * *